United States Patent [19]

Butterfield

[11] Patent Number: 4,502,345
[45] Date of Patent: Mar. 5, 1985

[54] ACCESSORY DRIVE SYSTEM
[75] Inventor: Roger P. Butterfield, Freeville, N.Y.
[73] Assignee: Borg-Warner Corporation, Chicago, Ill.
[21] Appl. No.: 119,290
[22] Filed: Feb. 7, 1980
[51] Int. Cl.³ .................. F16H 5/42; F16H 5/60
[52] U.S. Cl. .................. 74/336 B; 74/664; 74/856; 74/866
[58] Field of Search .......... 74/336 B, 336 R, 664, 74/665 P, 15.84, 843, 856, 866; 192/84 A; 474/28

[56] References Cited
U.S. PATENT DOCUMENTS

| | | | |
|---|---|---|---|
| 2,809,535 | 10/1957 | Hein et al. | 74/857 |
| 2,903,083 | 9/1959 | Kelley | 74/336 B X |
| 2,910,891 | 11/1959 | Heckethorn | 74/336 B X |
| 4,080,843 | 3/1978 | Underwood | 74/664 X |
| 4,257,508 | 3/1981 | Bennett et al. | 192/84 A |

FOREIGN PATENT DOCUMENTS 1420267  1/1976  United Kingdom .................. 474/28

Primary Examiner—Leslie A. Braun
Attorney, Agent, or Firm—Aubrey L. Burgess

[57] ABSTRACT

A two speed ratio accessory drive system especially for use with an automotive engine in which the accessories are driven either from the engine crankshaft or from the engine camshaft. A clutching system controlled to respond to needs and/or operating conditions is used to change the speed ratio between a high speed ratio and a low speed ratio.

1 Claim, 4 Drawing Figures

ACCESSORY DRIVE SYSTEM

BACKGROUND OF THE INVENTION

The modern automobile is being increasingly equipped with various accessories, some of which make driving easier and offer passenger comfort. Accessories can include the engine fan, alternator for the battery, air conditioning, and pumps for the engine cooling fluid and for servo-operations such as automatic transmission operation, power steering, power brakes and the like. Accessories are designed to operate at high and top engine speeds; however, most accessories have an optimum operating speed for a given condition. At low engine speeds the loss of efficiency or power by operating accessories is generally low. At high speeds, the loss of horsepower because of the operations of the accessories is much greater.

Accessory drive systems have been suggested which respond only to engine speed; which change the drive to a lower accessory ratio with increasing engine rpm, thereby maintaining accessory speeds essentially uniform over a large portion of the driving speed of the vehicle. Such drive systems are not generally sensitive to the demand or output of functions of the accessories, nor are they sensitive to the demand placed upon the vehicle engine. For example, in an accessory drive system responsive to speed of the engine, the power drain by the accessories can make acceleration of the vehicle sluggish or nonexistent.

Current stock accessory drive systems can be designed for adequate output for the worst operating conditions. For example, the engine fan must spin sufficiently fast to cool an air conditioning equipped vehicle at idle on a 95° F. day. Thus, the fan is rotated much faster than is actually required for cooling for the average conditions. It thus consumes more power—and fuel—than is generally necessary. Generally all the accessories share the characteristic of actually wasting energy to provide adequate output for extreme conditions. The ideal accessory drive system then can be envisioned as being a combination of separate power packs for each accessory, each individually controllable to provide ideal operation of the accessory. One can imagine the added cost for such system and also the space requirement for such system when the trend is toward more compact and lighter systems in smaller spaces.

THE INVENTION

The present invention relates to a two speed ratio accessory drive system in which pulleys on the engine crankshaft, camshaft and accessories are interconnected by one or more drive means, such as elastomeric belts. In the preferred embodiment, an overrunning clutch carries the camshaft pulley and a controllable clutch carries the crankshaft pulley. The controllable clutch can be constructed to respond to an electrical or other signal generated by a monitoring or sensing device which monitors or senses the operation of the accessories and/or the vehicle engine under the existing operating conditions. The controllable clutch can be an electro-magnetic clutch; the overrunning and controllable clutches can be state-of-the-art clutches so long as they perform the required functions.

With the accessory drive system of this invention, the accessories can be operated in the low ratio by the camshaft when the demand on the accessories is low and in the high ratio by the crankshaft when the demand on the accessories is high. In addition, when conditions exist where the demand on the engine and the demand on the accessories are both high, the drive ratio of the accessories can be shifted from high ratio to low ratio to insure sufficient power from the engine for proper and/or desired operation of the vehicle. For example in a vehicle of relatively low horsepower and on a very hot day, the accessories will generally be operated at the high ratio to provide adequate passenger comfort by the air conditioning. When additional power is required, for example, for passing, the drive ratio of the accessory drive system can be shifted from high ratio to low ratio for the necessary length of time to provide the additional power for the maneuver.

In sophisticated accessory drive systems, the drive ratio can be controlled by a computer and/or other monitoring devices; such devices are currently being offered in several lines of automobiles and it is predicted that their use will become more commonplace in the near future. However, the accessory drive system of this invention may be operated manually by the driver of the automobile, as by an off-on switch in a relatively simple electrical system or a lever in a relatively simple mechanical system.

In as much that the accessories can be operated most of the time on the low ratio drive i.e., from the camshaft (as opposed to the existing drives which operate from the crankshaft), less power is required and thus a savings in fuel can be experienced. Also, the system is relatively small and is easily adapted to the new generation of transverse engine mounted front wheel drive vehicles where space is at a premium.

In the foregoing description, reference has been made to the crankshaft and the camshaft. Inherently in four cycle engine design, the camshaft turns at exactly one-half the crankshaft speed. However, the accessories can be driven from a shaft other than the camshaft, as for example, a balance shaft driven by a timing chain or belt and at a speed lower than the crankshaft.

THE DRAWINGS

DETAILED DESCRIPTION

Figure 1:
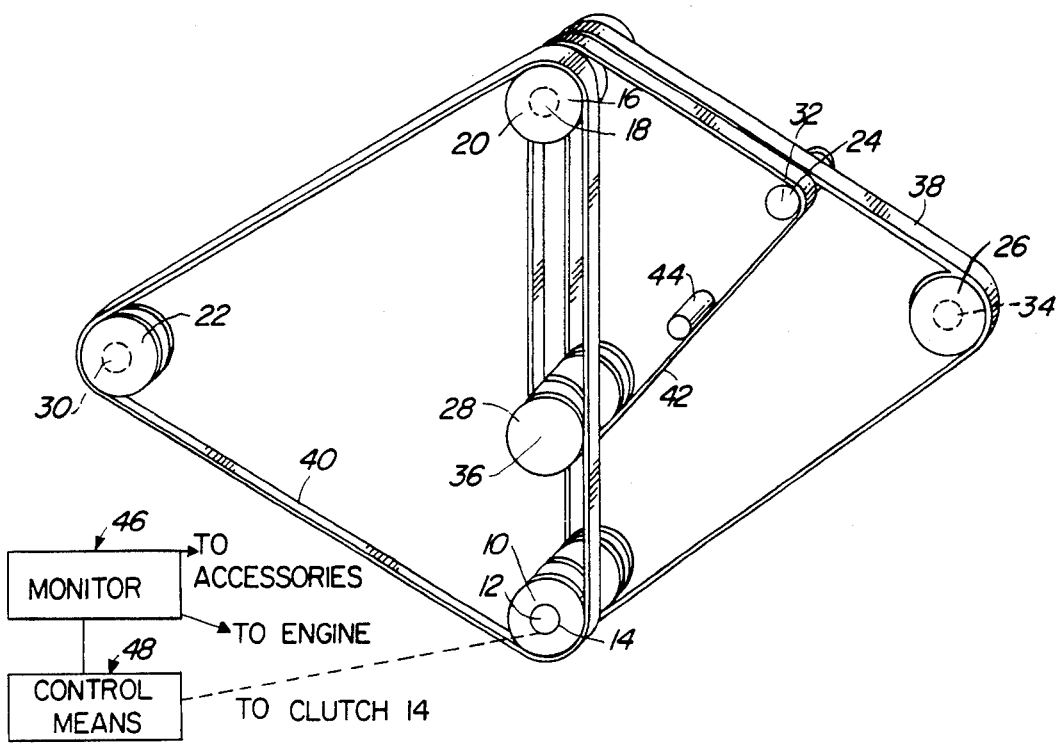
FIG. 1 is an illustration of one form of the accessory drive system according to this invention.

Looking now at FIG. 1 of the drawing, a multi-belt accessory drive system according to this invention comprises a first pulley 10 connected to the crankshaft 12 of an engine (not shown) by a controllable clutch 14, such as an electro-magnetic clutch, a second pulley 16 connected to the camshaft 18 by an overrunning clutch 20 and additional pulleys 22, 24, 26 and 28 connected, respectively, to the various accessories such as an air conditioning compressor 30, an alternator 32, a power steering pump 34 and a water pump 36. Each of these typical accessory devices is generally operated at a speed different from the other, the speed of operation being obtained by the pulley system. The camshaft 18 rotates at one-half the speed of the crankshaft 12. The pulleys 10, 16, 24 and 26 are connected by a drive belt 38; the pulleys 10, 16 and 22 are connected by a drive belt 40; and the pulleys 16, 28 and 24 are connected by a belt 42. An idler 44 is provided to maintain a tension on the belt 42. While the illustrated system contains only four accessories, it is to be understood that other systems may include additonal accessories so long as the drive system includes the crankshaft and the camshaft pulleys 10 and 16 and their respective clutches 14 and 20.

The two clutches, 14 and 20, while of different varieties, are state-of-the-art devices which need no further description except in the manner in which the arrangement operates.

The accessory drive system may further comprise a monitor or sensor 46 to monitor the function of the accessories and the engine and a control means 48, such as a mini-computer, to actuate or deactuate, as the case may be, the controllable clutch 14. Mini-computers of the kind used in this invention are found in some vehicles today and their increased use in the future vehicle appears to be a certainty.

As will be readily understood under normal operating conditions, the drive to the belts 38, 40 and 42 is through the pulley 16 and the clutch 20 from the camshaft 18, the pulley 10 on the crankshaft 12 freewheeling on the shaft 12. In this mode of operation the accessories are in their second or low drive ratio. When the monitor or sensor 46 senses a change in the operating characteristics of one of the accessories indicating the desirability for increasing the drive ratio, the control means 48 sends a signal to the cluch 14, thus actuating the clutch 14 and connecting the pulley 10 to the crankshaft 12. When this occurs, the clutch 20 will overrun and the drive will be through the pulley 10 and the crankshaft 12 at a higher speed ratio. Likewise, when the accessory system is operating in the high ratio drive and a change in the operating characteristics of the vehicle is sensed indicating the desirability for decreasing the drive ratio, the control means deactivates the clutch 14, so that it freewheels, thus connecting the drive to the clutch 20. The accessories are then driven in the lower speed ratio mode.

Figure 2:
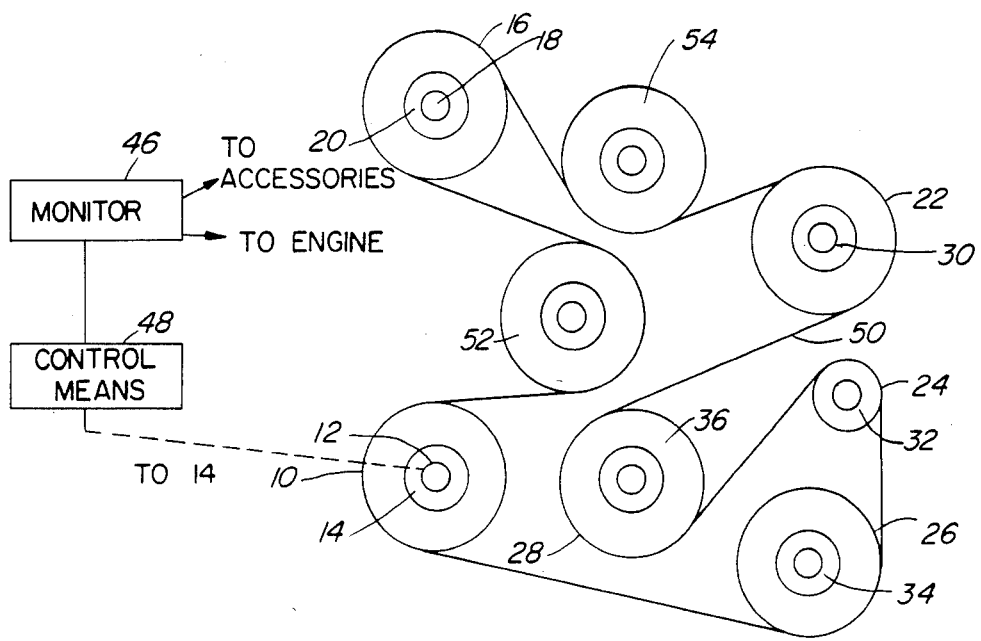
FIG. 2 is an illustration of another form of the accessory drive system according to this invention.

The major difference in the drive systems of FIGS. 1 and 2 is the manner of connecting the various pulleys. The system of FIG. 1 employs multiple belts. Additional belts could be used to drive additional accessories where necessary, so long as the additional belts and their accessories are connected to a crankshaft and a camshaft pulley.

In the FIG. 2 embodiment, a single belt connection is used, the belt being identified by the reference character 50 while the accessory devices and their pulleys are identified with the same reference characters as in the FIG. 1 embodiment. Idlers 52 and 54 maintain tension on the belt 50.

Figure 3:
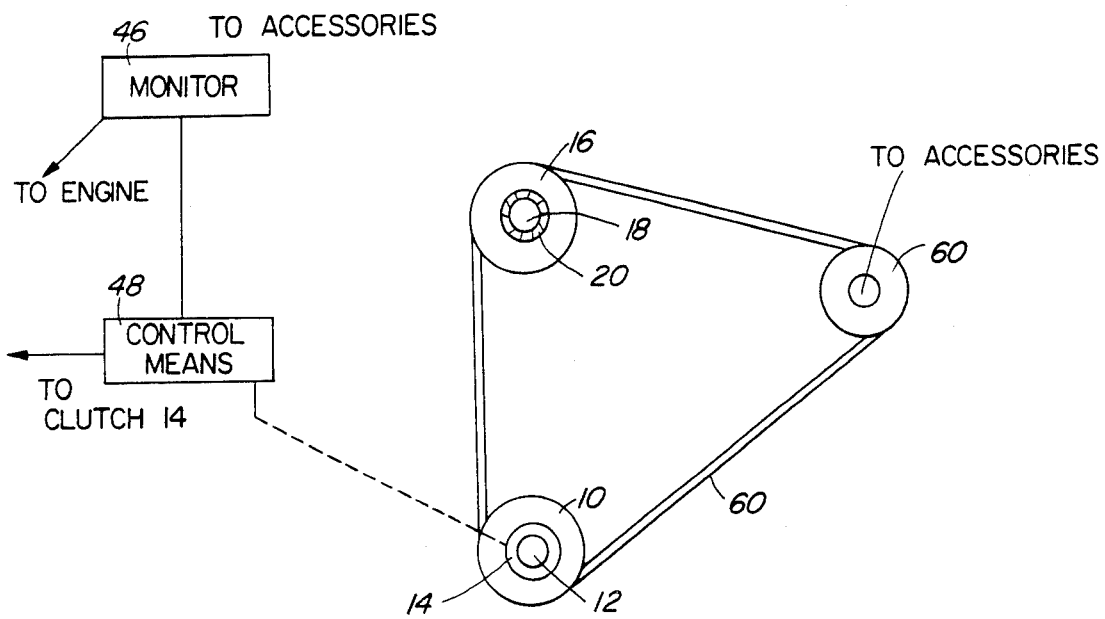
FIG. 3 is an illustration of still another form of the accessory drive system according to this invention.

Another form of the invention is illustrated in FIG. 3 of the drawing wherein a single drive belt 58 connects the pulleys 10 and 16 and also a pulley 60 from which the various accessories are driven. As will be readily understood, the operation of the system of FIG. 3 is essentially the same as that of the other embodiments of the invention.

It is to be understood that an intermediate driven shaft, operated at a speed different from the driving crankshaft, can be used instead of the camshaft 18 for driving the drive pulley 16 and overrunning clutch 20 without departing from the spirit of this invention.

Figure 4:
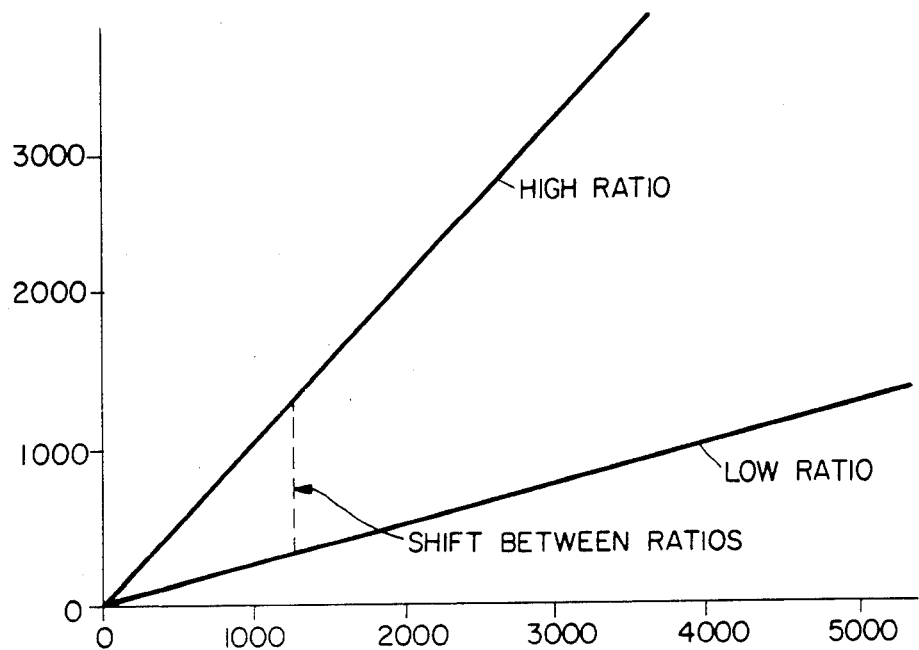
FIG. 4 is a graph showing two drive ratios for the system as well as a typical shift pattern between the two drive ratios.

Typical two speed drive ratios are shown in the graph of FIG. 4, it being understood that drive ratios will vary depending on accessory and engine designs. Shifting from one to the other at some point—upon demand of the accessories and/or the engine—is illustrated in the broken lines on the same graph. The particular location of the shifting curve is dependent upon various factors and conditions; the curve here is merely illustrative of a typical shift pattern.

I claim:

1. A two speed ratio drive arrangement for driving accessories associated with an internal combustion engine of an automotive vehicle, comprising:
   a crankshaft connected to and driven by said engine at a first speed range;
   a pulley on said crankshaft;
   a second shaft rotatable at a second and lower speed range;
   a pulley on said second shaft;
   one or more accessories for said vehicle, each having a shaft and a driving pulley;
   a belt connecting said accessory pulleys to said crankshaft pulley and to said second shaft pulley;
   an electro-magnetic clutch adapted to be energized and de-energized for connecting and disconnecting said crankshaft and said pulley thereon;
   a second overrunning one-way clutch for connecting and disconnecting said second shaft and the pulley thereon;
   said second shaft and said pulley thereon being normally connected and driving accessory pulleys and overrunning when said electro-magnetic clutch is energized;
   said crankshaft and said pulley thereon driving accessory pulleys when said electro-magnetic clutch is energized; and
   means for energizing said electro-magnetic clutch;
   said last-named means being so constructed and arranged to be controllable by changes in operating characteristics of said accessories and of said engine.

* * * * *